3,369,010
5-(4-ACRYLOXYALKYL)-HYDANTOINS
AND POLYMERS THEREOF
Everett J. Kelley, Moorestown, N.J., assignor to Rohm
& Haas Company, Philadelphia, Pa., a corporation of
Delaware
No Drawing. Original application June 8, 1964, Ser. No.
373,486. Divided and this application Oct. 12, 1965,
Ser. No. 495,340
9 Claims. (Cl. 260—86.1)

This application is a division of my copending application Ser. No. 373,486, filed June 8, 1964.

This invention relates to new polymers. It is particularly concerned with polymers of hydantoins and thiohydantoins substituted in the five position with a radical comprising an acrylic group.

The monomeric compounds of the present invention have the general formula

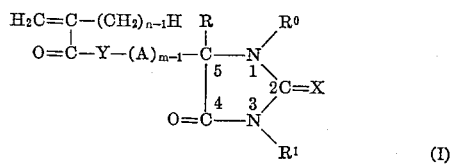

wherein $m$ is an integer having a value of 1 to 2,
$n$ is an integer having a value of 1 to 2,
$Y$ is selected from the group consisting of O and NH,
$A$ is an alkylene group having 1 to 8 carbon atoms,
$R$ is selected from the group consisting of H, benzyl, cyclohexyl, phenyl, and alkyl groups having 1 to 6 carbon atoms,
$R^0$ is selected from the group consisting of H, methylol, and alkoxymethyl groups having 2 to 5 carbon atoms,
$R^1$ is selected from the group consisting of hydrogen, methylol, and alkoxymethyl groups having 2 to 5 carbon atoms, and
$X$ is selected from the group consisting of O and S.

Preferred compounds are those of the formula

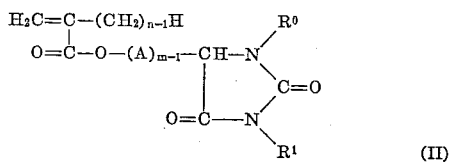

wherein $m$, $n$, $A$, $R^0$ and $R^1$ are as defined above. When it is not desired that polymers of the composition of Formula I be strongly susceptible to be cured to an insoluble and infusible state, the $R^0$ and $R^1$ are preferably both hydrogen, whereas if a readily curable or cross-linkable polymeric material is desired, at least one $R^0$ and $R^1$ is preferably either methylol or alkoxymethyl having 1 to 5 carbon atoms. Surprisingly, however, it appears that even in the polymers obtained from Formula I compounds in which $R^0$ and $R^1$ are hydrogen atoms, there is some tendency for the polymers to become more insoluble and less readily fusible.

The preparation of the monomers is disclosed in Ser. No. 373,486 and the disclosure of the methods of preparation and starting materials used therein are incorporated herein by reference.

The compound of Formula I may be polymerized or copolymerized in bulk, in solution or in either emulsion or suspension technique to produce various types of polymers including the granular type. Solution polymerization may be effected in such solvents as water, dimethylformamide or other of the solvents mentioned above in which the compounds of Formula I and any comonomers that may be used are suitably soluble. Although some of the compounds of Formula I may have an appreciable solubility in water, all of the compounds of Formula I may be polymerized with or without other monomers by an emulsion technique in which the comonomers and any excess of the compound of Formula I over the amount that is soluble in the water are emulsified by non-ionic, cationic or anionic emulsifiers or suitable mixtures thereof. When persulfates are used as initiators as described hereinafter, stable latices may be obtained even without including an emulsifier initially in the polymerization system.

The polymerization may be effected with the aid of a free radical initiator or catalyst, such as an organic or inorganic peroxide catalyst, peroxy catalysts, such as persulfates, and the azo catalysts. From 0.1% to 3% or more of the initiator or catalyst may be used, based on the total weight of the monomers. To provide a high molecular weight, it is preferred to use from 0.5% to 1% of the initiator. Examples of organic peroxide catalysts that may be used include benzoyl peroxide, acetyl peroxide, caproyl peroxide, butyl perbenzoate, butyl hydroperoxide. Examples of azo catalysts include azeodiisobutyronitrile, azodiisobutyramide, dimethyl or diethyl or dibutyl azodiisobutyrate, azobis($\alpha,\gamma$ - dimethylvaleronitrile), azobis($\alpha$-methylbutyronitrile), azobis($\alpha$-methylvaleronitrile), dimethyl or diethyl azobismethylvalerate, and the like.

In the case of emulsion polymerization particularly, a redox system is extremely effective. Here an organic peroxide may be used or an inorganic peroxide such as hydrogen peroxide, ammonium persulfate, sodium persulfate, or potassium persulfate in amounts similar to those stated above. The peroxidic catalyst is effectively coupled with a reducing agent such as an alkali metal sulfite, bisulfite, or metabisulfite, or hydrosulfite or hydrazine. The action of the redox system may be controlled through use of a chain transfer agent or regulator such as mercaptoethanol or other mercaptan. Such regulator also finds use outside of redox systems with organic or inorganic peroxides and with azo catalysts, such as azodiisobutyronitrile, azodiisobutyramide, or diethyl azodiisobutyrate.

When a solution technique is used, the direct product of the polymerization is a viscous solution of the polymer, or it may be that the polymer is precipitated from the solution depending upon the particular solvent, the particular monomers and their properties. When the polymers automatically precipitate because of their insolubility in the solution, it is merely necessary to filter the product and wash the polymer in order to isolate it. When the product is a viscous solution of the polymer, it may be precipitated by adding a solvent for the polymerization solvent in which the polymer is insoluble after which the suspension or slurry may be filtered or decanted and the polymer washed. Alternatively, the solvent may be distilled to leave the polymer.

In the case of emulsion polymerization, examples of suitable non-ionic emulsifiers include the higher alkyl phenoxypolyethoxyethanols in which alkyl the group has from 6 to 18 carbon atoms, such as octyl dodecyl or octadecyl, and there may be from 8 to 50 or more oxyethylene units. Examples of anionic emulsifiers include the higher fatty alcohol sulfates, such as sodium lauryl sulfate; examples of cationic emulsifiers include higher alkyl pyridinium salts such as lauryl pyridinium chloride, (octylbenzyl)-trimethylammonium chloride, and so on.

Examples of vinylidene or monoethylenically unsaturated compounds that may be copolymerized with the compound of Formula I includes vinylpyridines, such as 2-vinylpyridines and 4-vinylpyridines, acrylonitrile, methacrylonitrile, acrylic and methacrylic acids, their esters, amines and salts, itaconic acid and its functional derivatives, particularly its esters, maleic anhydride or maleic and fumaric acids and their esters, vinyl ethers and esters, vinyl sulfide, styrene and its homologues and analogues, vinylcarbazole, and allyl esters of monocarboxylic acids. Specific vinylidine compounds are methyl, ethyl, isopropyl, butyl, tert-butyl, octyl, dodecyl, octadecyl, octenyl, or oleyl acrylates or methacrylacrylates or itaconates, dimethyl maleate or furmarate, diethyl maleate, diethyl fumarate, diethyl citraconate, diethyl chloromaleate, dimethylaminoethyl acrylate or methacrylate, tert-butylaminoethyl acrylate or methacrylate, dimethylaminopropyl acrylate or methacrylate, acrylamide, methacrylamide, N-methylacrylamide, N-butylmethacrylamide, dimethylaminoethylacrylamide, dimethylaminopropylacrylamide, or the comparable methacrylamides, hydroxyethyl vinyl ether, octyl vinyl ether, dodecyl vinyl ether, ureidoethyl vinyl ether, uredioisobutyl vinyl ether, ethyl vinyl ether, butyl vinyl ether, butyl vinyl sulfide, methyl vinyl sulfide, dodecyl vinyl sulfide, vinyl acetate, vinyl propionate, vinyl laurate, α-methylstyrene, p-methylstyrene, p-chlorostyrene, vinylnaphthalene, etc. When two or more free radical-polymerizable vinylidene groups occur, as in divinylbenzene, trivinylbenzene, ethylene diacrylate or methacrylate, bis(vinyloxyethyl)urea, or vinyloxyethyl acrylate or methacrylate, insoluble interpolymers result.

Copolymers may be prepared from about 0.2 to 99.8% by weight of at least one compound of Formula I with from 99.8 to 0.2% of at least one other ethylenically unsaturated monomer having a group of the formula $H_2C=C<$. Normally, the preferred copolymers are those formed exclusively of monoethylenically unsaturated copolymerizable molecules which give rise to thermoplastic, linear polymers. However, for some purposes, a small amount, e.g., from 0.1 to 25% by weight, based on the total weight of the monomeric material, of a polyethylenically unsaturated material, such as divinylbenzene, ethylene glycol dimethacrylate, butylene glycol dimethacrylate, or diallyl phthalate, may be included to increase the molecular size of the copolymer or to form a cross-linked product. Thus, up to 20% of such polyethylenically unsaturated material may be mixed with methyl methacrylate (e.g. 75%) and a compound of Formula I (e.g. 5%) to form a molding composition which is mixed with a catalyst such as benzoyl peroxide and polymerized in a suitable mold by heating in conventional fashion. Preferred copolymers are those of copolymerizable monoethylenically unsaturated molecules having a group of the formula $H_2C=C<$ comprising about 1 to 10% by weight, based on the total monomer weight, of at least one compound of the Formula I.

The polymers of the N-methylol or N-methoxymethyl compounds of Formula I which are water-soluble, such as copolymers of the compound of Formula I, which by virtue of adequate content of water-soluble monomers whether of those of Formula I or of others, such as acrylic acid, acrylamide, or the like, may be used as sizes for paper, textiles and particularly as warp sizes. When introduced into paper pulps, they may provide increased wet strength in the final dry paper containing them. For this purpose, there may be used from about 1% to 7% of a polymer of one of the compounds of Formula I on the dry fiber weight of the paper. They may be used as curable thickeners for various aqueous coating, adhesive, and film-forming compositions. These polymers may be used in admixture with other materials, such as starch, gelatin, or plasticizers therefor to provide coatings or films, thickening materials, warp sizes or the like. These polymers mixed with other film-forming materials, such as vinyl and acrylic resins, may be pigmented or dyed to provide heat-cured decorative coatings on substrates, such as textile, leather, paper, wood or on metal or glass surfaces. These polymers may be combined with aminoplast resin-forming condensation products, such as those of urea-formaldehyde or triazine-formaldehyde condensates including melamine-formaldehyde. The inclusion of these polymers of the present invention may serve to increase the toughness of the product and the water-resistance thereof when used in amounts of about 5% to 15%, based on the weight of aminoplast condensate.

Water-insoluble copolymers containing from about 0.5 to 20% by weight or more of the compounds of Formula I with various comonomers may be used as coating materials which may be pigmented or not, and may contain plasticizers or not, and in the case of emulsion copolymers, they are adapted to provide valuable water-base paints.

Examples of plasticizers that may be used are dibutyl phthalate, butyl benzyl phthalate, triphenyl phosphate, di-n-hexyl adipate, methyl abietate, ethyl phthalyl ethyl glycolate, tributyl phosphate, diisooctyl phthalate, and glycerol monoricinoleate. Examples of pigments include carbon black, tianium dioxide, ultramarie blue, lead chromate, copper phthalocyanine blues and greens, zinc chromate, zinc oxide, clays, calcium carbonate, lead carbonate, and barium sulfate, iron oxides, toluidines, Prussian Blue, Chrome Yellow, Para Red Toners, Lithol Red, Cadmium Red, and Chrominum oxide.

Copolymers containing at least 1% and preferably from 5 to 20% by weight of a compound of Formula I with ethyl acrylate, butyl acrylate, or the like, may be used to reduce the shrinkage of wool. For this purpose, they may be applied in aqueous dispersions of a concentration from 10 to 30% so that from about 5 to 15% by weight of the copolymer is deposited on the wool fabric. After drying, the treated fabric may be heated to 240° F. to 350° F. for a period of one-half to fifteen minutes.

The copolymers containing ½ to 5% or even up to 10 or 20% by weight of units derived from a monomer of Formula I may be used to bond fibers in non-woven fabrics of all types of material and synthetic fibers or filaments made by the air-deposition, carding, or garnetting of the fibers or filaments, such as those of rayon, wool, cellulose acetate and other esters and ethers, vinyl resins, polymers of acrylonitrile, poly(ethylene glycol terephthalate), glass, and other mineral fibers, and so on. For this purpose, there may be used from 5 to 150% by weight of the binder on the weight of fiber or even as high as 400% thereon. The treated fibrous material should be dried and then subjected to a bake, such as at 240° F. to 350° F. for a period of one-half to thirty minutes, to cure the polymer thereon. For the bonding of non-woven fabrics, an aqueous dispersion of an emulsion copolymer may be prepared by the procedure of example 4 hereinafter using the following monomers in the proportions stated:

|  | g. |
|---|---|
| 5-methacryloxy-1,3-dimethylol-hydantoin | 10 |
| Ethyl acrylate | 80 |
| Acrylamide | 5 |
| N-methylolacrylamide | 5 |

A non-woven fabric formed of several plies of carded viscose rayon fibers with alternate layers cross-laid with respect to each other so that the assemblage has a weight of 2.5 ounces per square yard can be padded through the acidic copolymer dispersion thus obtained to provide about 200% wet pickup. The impregnated fabric may then be dried in ambient air a few minutes and heated at about 150° C. for about 5 minutes to produce a fabric which is well bonded and resistant to laundering as well as drycleaning.

Similar aqueous dispersions made by the emulsion copolymerization of a monomer of Formula I with acrylic esters and especially butyl acrylate or ethyl acrylate may be used, with or without pigment, for the primary coating of leather. In this connection, the heterocyclic group may exert some chemical bonding action with the structure of the leather so as to provide good adhesion. For example, an aqueous dispersion of emulsion copolymer obtained by the procedure of (4) hereinafter from a mixture of 35% by weight of vinylidene chloride, 58% by weight of butyl acrylate, 6% by weight of 5-acrylamideomethylhydantoin, and 1% of itaconic acid can be applied at 45% solids concentration to a full-grain cowhide, dried at room temperature and then a second coat of the same copolymer dispersion but containing an iron oxide pigment (binder to pigment ratio of 1 to 1.1) can be applied as a topcoat to provide a well-adhered finish on the leather. Copolymers with acrylonitrile, especially those containing from 75 to 90% of acrylonitrile, with a compound of Formula I may be used as fiber- and film-forming materials which are adapted to be spun or cast to form fibers and films which may be characterized by improved receptivity toward dyes. Copolymers of a compound of Formula I with acrylic acid or methacrylic acid or copolymers thereof with a vinylpyridine, when included in melts or solutions of polymers of acrylonitrile containing 75 to 90% acrylonitrile, such as copolymers thereof with vinyl chloride, vinyl acetate or the like, may serve to modify the dyeing properties of fibers and films formed therefrom.

Well-adhered insulating coatings for aluminum and copper can also be prepared from copolymers of the present invention. For instance, bare aluminum or copper wires can be coated by immersion three times (with intervening drying and heating at 250° C. for about 1 minute) in a (45) solid aqueous dispersion of an emulsion copolymer prepared in (4) hereinafter of 6.5% by weight of acrylonitrile, 30% by weight of 2-ethylhexyl acrylate, 3% by weight of methacrylamide, and 2% by weight of 5-(2-methacryloxyethyl)-5-benzyl - 1,3 - dimethoxymethyl-hydantoin which dispersion also contains (at 10% concentration) dimethylformamide.

The copolymers may also be blended with other resins, such as the aminoplast resin-forming condensation products mentioned above, vinyl or acrylic resins, such as polystyrene, polyvinyl chloride, polymethyl methacrylate, alkyds, cellulose esters and ethers, to form valuable coatings compositions. The copolymerization of small amounts (½ to 5%) of a monomer of Formula I with methyl methacrylate in the normal casting procedure for making shaped polymeric articles can serve to increase the lower limit of temperature at which distortion occurs and also to reduce the susceptibility to solvents. In one preferred manner of operating, the casting may be done under conditions which bring into play substantially only the addition copolymerization reactivity so that the initially obtained casting is still thermoplastic; this casting may then be formed into the ultimately desired shape by heating under conditions which cross-link the copolymer to infusible condition through the reactive groups of the units derived from the compound of Formula I.

To illustrate the utility in blending with other resins an aqueous dispersion of a copolymer of about 1 to 5% by weight of a monomer of Formula I with 0 to 15% by weight of methyl methacrylate and the balance to make 100% of ethyl acrylate or butyl acrylate or a mixture thereof may be formed by emulsion polymerization, a polyvinyl chloride powder (obtained by suspension of polymerization) may be mixed into the aqueous dispersion along with a pigment such as titanium dioxide or the like and then the resulting mixture may be sheeted on a two-roll or a three-roll mill immediately or after having its water content reduced by working in a hot blender. The proportion of pigment may range from 5% to 150% by weight of the dispersed copolymer and the amount of dispersed copolymer may range from 5 to 100% by weight of polyvinyl chloride powder. Instead of polyvinyl chloride, there may be used copolymers of vinyl chloride with vinyl acetate and acrylonitrile or polystyrene and copolymers of styrene and acrylonitrile. The films obtained by rolling such mixtures or by extrusion thereof are tough yet flexible and homogeneous. Films obtained in this fashion but with little or no pigment are also useful as laminating films. That is, they can be inserted between thin sheets of wood to form plywood by application of pressure and heat to the assembled layers. Instead of laminating sheets of wood, the films may be used to laminate wood to metal, plastics to metal, metal to metal, or plastics to plastics. It appears that the laminated products are characterized by good resistance to separation either in dry or moist condition as the result of the presence in the laminating film of a polymer containing the monomer of the Formula I herein.

Water-soluble polymers containing units of a compound of Formula I may be used as dressings, sizes, or finished for textiles, leather, paper, and plastic materials that, because of their water-solubility, can be readily removed as in scouring a woven fabric after weaving, or can be converted to a permanent water-insoluble, organic-solvent-resistant and heat-resistant coating, finish or the like or any of the substrates mentioned by a baking operation at a temperature between 240° F. and 350° F. for a half to thirty-minute period or so. For example, acrylic or methacrylic acid may be copolymerized with ½ to 20% by weight of a compound of Formula I with or without one or more other comonomers which need not be hydrophilic, such as an ester of one of the acids, like ethyl acrylate, methyl methacrylate, and so on, and the copolymer neutralized with ammonium, sodium, potassium, or lithium hydroxide to provide a neutral or alkaline copolymer salt adapted to be used as a thickener, especially for aqueous systems, such as are used for textile printing or for loom sizes, which salt after drying on the textile may be insolubilized and rendered permanent by baking at 240° to 350° F.

In the polymers of the present invention, the entire heterocyclic group is characteristically outside of the carbon-to-carbon chain of the polymer backbone and this group has two nitrogen atoms each of which carries a readily reactive atom or group selected from the group consisting of hydrogen itself, methylol or alkoxymethyl having from 2 to 5 carbon atoms. It appears that the presence of this characteristic heterocyclic group outside the polymer chain provides inherent qualities of flexibility even after curing and adhesion to substrates generally.

To assist those skilled in the art to practice the present invention, the following modes of operation are suggested by way of illustration, parts and percentages being by weight unless otherwise specifically noted.

(1) A sample of 5-(4-methacryloxybutyl)-hydantoin obtained in (1) of Ser. No. 373,486 is homopolymerized by refluxing in benzene solution with 0.5% azobisisobutyronitrile catalyst (percent by weight based on the monomer).

(2) A solution copolymer composition is prepared in the following manner: 5-(4-methacryloxybutyl)-hydantoin (5 gms.) is dissolved in 15 gms. of β-methoxyethanol. This solution is added to 52 gms. of toluene in a glass polymerization flask equipped with a stirrer, reflux condenser, thermometer, and an addition funnel. The mixture is stirred and heated to 110° C. A monomer catalyst solution is made by mixing

|  | G. |
|---|---|
| n-Butyl methacrylate | 45 |
| Methyl methacrylate | 50 |
| Azobisisobutyronitrile | 0.5 |

This solution is added to the flask at an even rate over a period of two hours with continued stirring and heating (at 110°–115° C.). A catalyst solution of 0.5 g. azobisisobutyronitrile in 18 g. toluene is added to the batch in three equal portions, two, three, and four hours after the completion of the addition of the monomer mixture. After the mixture is heated for an additional three hours, it is cooled and diluted with 58 g. of toluene. The final solution contains 40% solids.

(3) Panels of degreased cold-rolled steel panel, aluminum, glass, and steel primed with a commercial alkyl primer are coated with the copolymer solution obtained in (2) above, dried at room temperature, and baked at 150° C. for about 30 minutes. Well adhered, tough coatings are obtained. The coatings show good wet-adhesion (that is, adherence after soaking in water) and dry-adhesion also.

(4) An emulsion copolymer composition is prepared in the following manner. To a 1-liter, 3-neck round-bottom flask fitted with a reflux condenser, thermometer, Teflon blade agitator and nitrogen inlet is charged water (580 gms.), t-octylphenoxypoly(40)ethoxyethanol (17.1 gms. of 70% solution), ethyl acrylate (110 gms.), methyl methacrylate (80 gms.), and 5-(4-methacryloxybutyl)hydantoin (10 gms.) in that order. The system is swept with nitrogen and the temperature adjusted to 15° C. with an ice bath. Polymerization is initiated by the addition of freshly prepared solutions of ammonium persulfate (0.2 gm. in 10 mls. $H_2O$), sodium hydrosulfite (0.2 gm. in 10 mls. $H_2O$), and ferrous sulfate (2.0 mls. of 0.1% solution of $FeSO_4 \cdot 7H_2O$) in the given sequence. The polymerization exotherm carries the batch temperature to 60° C. in 27 minutes. When the batch temperature drops 10° C. (air cooling only), an ice bath is applied and the dispersion cooled to room temperature. Dispersion solids following polymerization is approximately 25%.

This latex produces well-adhered protective films on alkyd, wood, and steel surfaces.

(5) 5-(4-acryloxybutyl)-hydantoin is polymerized to an insoluble solid by refluxing in benzene solution with 0.5% by weight (based on the monomer) of azobisisobutyronitrile catalyst.

(6) A solution copolymer may be prepared by the procedure of (2) above using as the monomers 90 g. methyl methacrylate, 5 g. ethyl acrylate, and 5 g. of 5-(4-acryloxybutyl)hydantoin. The product obtained may be used, with or without a pigment, to coat substrates of various metals, e.g., cold-rolled steel, aluminum, and copper or plastics, especially alkyds, e.g., alkyd-primed steel panels to provide adherent protective coatings thereon.

(7) An emulsion copolymer may be prepared by the procedure of (4) above using as the monomers, 120 g. ethyl acrylate, 250 g. vinyl acetate, and 8 g. 5-(4-acryloxybutyl)-hydantoin. A white water-base paint may be made from this dispersion in conventional fashion and using titanium dioxide pigment. The paint adheres well to wood and masonry surfaces. The formulaton of the paint may be as follows:

| | Parts |
|---|---|
| Water | 39.0 |
| Ammonium salt of maleic anhydride/diisobutylene copolymer | 0.4 |
| Rutile titanium dioxide | 28.3 |
| Water ground mica | 71.7 |
| Hydroxyethyl cellulose (2%) | 71.7 |
| Ethylene glycol | 1.4 |
| Copolymer dispersion (46% solids) | 723.0 |
| Preservative | 4.3 |
| Anti-foamer | 2.8 |

| | Percent |
|---|---|
| Total solids | 45.7 |
| Pigment volume content | 10.0 |

(8) A copolymer may be prepared by the procedure of (2) above from 50 g. methyl methacrylate, 25 g. styrene, 10 g. ethyl acrylate and 15 g. of 5-(4-methacryloxypentyl)-5-methylhydantoin. The resulting polymer solution may be applied to aluminum and cold-rolled steel panels to provide adherent protective coatings thereon.

(9) An aqueous dispersion may be prepared, by the procedure of (4) above, of a copolymer of about 65% acrylonitrile, 30% butyl acrylate, and 5% of 5-(4-methacrylamidobutyl)-hydantoin. Insulating protective coatings on aluminum and copper conductors may be prepared by adding 10% dimethylformamide to the dispersion, coating the conductors therewith several (3 to 6) times with intervening drying and heating to 300° C. about a minute.

I claim:
1. As a composition of matter, an addition polymer of a compound of the formula

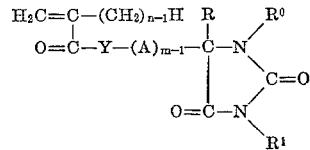

wherein
$m$ is an integer having a value of 1 to 2,
$n$ is an integer having a value of 1 to 2,
Y is selected from the group consisting of O and NH,
A is an alkylene group having 1 to 8 carbon atoms,
R is selected from the group consisting of H, benzyl, cyclohexyl, phenyl, and alkyl groups having 1 to 6 carbon atoms,
$R^0$ is selected from the group consisting of H, methylol, and alkoxymethyl groups having 2 to 5 carbon atoms, and
$R^1$ is selected from the group consisting of H, methylol, and alkoxymethyl groups having 2 to 5 carbon atoms.

2. As a composition of matter, an addition copolymer of at least one compound of the formula

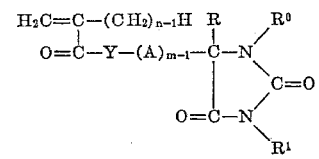

wherein
$m$ is an integer having a value of 1 to 2,
$n$ is an integer having a value of 1 to 2,
Y is selected from the group consisting of O and NH,
A is an alkylene group having 1 to 8 carbon atoms,
R is selected from the group consisting of H, benzyl, cyclohexyl, phenyl, and alkyl groups having 1 to 6 carbon atoms,
$R^0$ is selected from the group consisting of H, methylol, and alkoxymethyl groups having 2 to 5 carbon atoms, and
$R^1$ is selected from the group consisting of H, methylol, and alkoxymethyl groups having 2 to 5 carbon atoms,
with at least one other copolymerizable ethylenically unsaturated compound having a group of the formula $$H_2C=C<$$

3. As a composition of matter, an addition copolymer of about 0.2 to 99.8% by weight of at least one compound of the formula

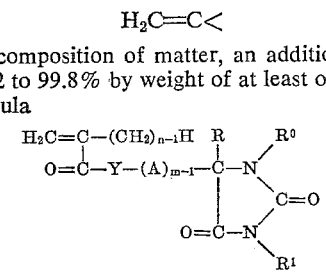

wherein
$m$ is an integer having a value of 1 to 2,
$n$ is an integer having a value of 1 to 2,
Y is selected from the group consisting of O and NH,
A is an alkylene group having 1 to 8 carbon atoms,
R is selected from the group consisting of H, benzyl, cyclohexyl, phenyl, and alkyl groups having 1 to 6 carbon atoms,
$R^0$ is selected from the group consisting of H, methylol, and alkoxymethyl groups having 2 to 5 carbon atoms, and
$R^1$ is selected from the group consisting of H, methylol, and alkoxymethyl groups having 2 to 5 carbon atoms,
with at least one other copolymerizable ethylenically unsaturated compound having a group of the formula $$H_2C=C<$$

4. As a composition of matter, an addition polymer of a compound of the formula

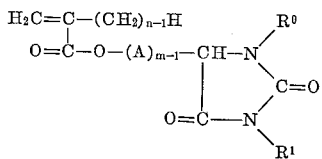

wherein
m is an integer having a value of 1 to 2,
n is an integer having a value of 1 to 2,
A is an alkylene group having 1 to 8 carbon atoms,
$R^0$ is selected from the group consisting of H, methylol, and alkoxymethyl groups having 2 to 5 carbon atoms,
$R^1$ is selected from the group consisting of H, methylol, and alkoxymethyl groups having 2 to 5 carbon atoms.

5. As a composition of matter, an addition copolymer of about 0.2 to 99.8% by weight of at least one compound of the formula

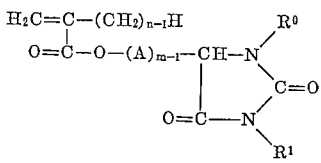

wherein
m is an integer having a value of 1 to 2,
n is an integer having a value of 1 to 2,
A is an alkylene group having 1 to 8 carbon atoms,
$R^0$ is selected from the group consisting of H, methylol, and alkoxymethyl groups having 2 to 5 carbon atoms,
$R^1$ is selected from the group consisting of H, methylol, and alkoxymethyl groups having 2 to 5 carbon atoms, with at least one other copolymerizable ethylenically unsaturated compound having a group of the formula $H_2C=C<$ 6. As a composition of matter, an addition copolymer of about 0.2 to 99.8% by weight of 5-(4-methacryloxybutyl)-hydantoin, with at least one other copolymerizable monoethylenically unsaturated compound having a group of the formula $H_2C=C<$.

7. As a composition of matter, an addition copolymer of about 0.2 to 99.8% by weight of 5-(4-methacryloxybutyl)-hydantoin, with at least one compound selected from the group consisting of vinyl acetate, acrylonitrile, styrene, an acrylamide, and an ester of an acid of the formula

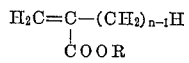

in which n is an integer having a value of 1 to 2, and R is selected from the group consisting of phenyl, benzyl, cyclohexyl, and ($C_1$–$C_{18}$)-alkyl groups.

8. As a composition of matter, an addition copolymer of about 0.2 to 99.8% by weight of 5-(4-acryloxybutyl)-hydantoin with at least one other copolymerizable monoethylenically unsaturated compound having a group of the formula $H_2C=C<$.

9. As a composition of matter, an addition copolymer of about 0.2 to 99.8% by weight of 5-(4-methacryloxypentyl)-5-methyl-hydantoin with at least one other copolymerizable monoethylenically unsaturated compound having a group of the formula $H_2C=C<$.

References Cited

FOREIGN PATENTS
635,216   1/1962   Canada.

JOSEPH L. SCHOFER, *Primary Examiner.*

H. WONG, *Assistant Examiner.*